(12) United States Patent
Lyu et al.

(10) Patent No.: US 7,619,727 B2
(45) Date of Patent: Nov. 17, 2009

(54) APPARATUS FOR DETECTING WAVELENGTH AND MEASURING OPTICAL POWER

(75) Inventors: Gap Youl Lyu, Irvine, CA (US); Kilhun Koo, Northridge, CA (US); Min Hee Kang, Irvine, CA (US); Ba Cao, Simi Valley, CA (US)

(73) Assignee: Raybit Systems Inc., Santa Ana, CA (US)

( * ) Notice: Subject to any disclaimer, the term of this patent is extended or adjusted under 35 U.S.C. 154(b) by 626 days.

(21) Appl. No.: 11/447,952

(22) Filed: Jun. 7, 2006

(65) Prior Publication Data
US 2009/0033923 A1   Feb. 5, 2009

(51) Int. Cl.
*G01J 1/42* (2006.01)
(52) U.S. Cl. .................. 356/218; 356/221; 356/226
(58) Field of Classification Search .......... 356/218, 356/221, 222, 226; 250/214 A, 226
See application file for complete search history.

(56) References Cited

U.S. PATENT DOCUMENTS

| | | | | |
|---|---|---|---|---|
| 5,748,302 A | * | 5/1998 | Unno | 356/224 |
| 5,850,292 A | * | 12/1998 | Braun | 356/419 |
| 6,043,480 A | * | 3/2000 | Sakamoto et al. | 250/214 A |
| 6,590,644 B1 | * | 7/2003 | Coin et al. | 356/218 |
| 7,105,799 B2 | * | 9/2006 | Chen et al. | 250/214.1 |
| 7,253,902 B2 | * | 8/2007 | Feldman | 356/416 |
| 7,282,691 B2 | * | 10/2007 | Wilsey et al. | 250/214 R |

* cited by examiner

*Primary Examiner*—L. G Lauchman
(74) *Attorney, Agent, or Firm*—Pearl Cohen Zedek Latzer, LLP (57) ABSTRACT

The present invention relates to a light wavelength and intensity measuring device. The device automatically measures a center wavelength of the light source and an intensity of the light corresponding to the center wavelength by using a main photodetector, at least one optical filter, and at least one sub photodetector when the light source is connected to the device. The main photodetector detects the intensity of the light applied by the light source, the optical filter transmits the light corresponding to a prediscriminated transmission wavelength, and the sub photodetector detects the intensity of the light transmitted through the optical filter. Therefore, the light intensity is more accurately measured by calibrating the intensity according to the wavelength.

9 Claims, 6 Drawing Sheets

APPARATUS FOR DETECTING WAVELENGTH AND MEASURING OPTICAL POWER

BACKGROUND OF THE INVENTION

The present invention relates to an apparatus for detecting optical wavelength and measuring optical power. More particularly, the present invention relates to an apparatus for automatically discriminating optical wavelength provided by a light source and automatically measuring corresponding optical power.

In general, in order to maintain a multi-channel and multi-light subscriber network, it is necessary to measure the wavelength and power of a light source. Here, the light source is a multichannel light source having a prediscriminated wavelength group. The wavelength of the light source indicates the center wavelength, and the power of the light source represents the power of the light having the center wavelength.

Recently, the fiber to the home (FTTH) network has been introduced to the market, easy-to-use methods for accurately measuring wavelength and intensity of light sources have been eagerly needed for the purpose of maintenance on the FTTH network.

In the IEEE standard, the FTTH network currently uses the wavelengths with the bandwidths of 1310 nm, 1490 nm, and 1550 nm. When the optical fibers are laid or amended/restored in an optical subscriber network, it is required to measure intensity of optical signals that correspond to the center wavelength of the light source and other wavelengths and maintain the performance of the network by using the measured value.

In general, it is only possible to accurately measure the light intensity when the center wavelength of the light source is known since spectral sensitivity of the photodetector used for detecting the optical intensity depends on the wavelengths. Methods for measuring the wavelength of the light source include a method for using an additional optical spectrum analyzer and a method for using predetermined display data that are identified by color tags of optical fibers. By using the above-noted methods, the wavelengths of the light source are analyzed, a prediscriminated wavelength is selected manually, and the intensity of the selected wavelength is measured. In detail, it is controlled for the detector to detect the light of the selected wavelength by manipulating a manual wavelength selection terminal installed in the photodetector. According to the manipulation, the photodetector detects the light of the selected wavelength, outputs a corresponding electrical signal, and measures the light intensity according to the signal.

Conventionally, the center wavelength of the light source is discriminated in advance according to the user's manual manipulation by use of an additional device, the light of the discriminated center wavelength is then measured. It required a great deal of time to measure the light intensity of the center wavelength.

Also, the cost increases since an expensive optical spectrum analyzer or predetermined display data are used to discriminate the center wavelength.

In addition, errors may occur in the measured values because of manual operation since the wavelength is manually selected and the corresponding right is measured when the wavelength of the light source is discriminated.

SUBJECT MATTER OF THE INVENTION

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device having advantages of accurately measuring the wavelength and intensity of the light source.

The present invention has been made in an effort to provide a device having advantages of automatically discriminating the center wavelength of the light source when the light source is inserted, and accurately measuring the light intensity corresponding to the discriminated wavelength.

An exemplary embodiment of the present invention provides a device for measuring wavelength and intensity of light applied by a light source, which comprises a main photodetector for detecting the intensity of the light applied by the light source and outputting a corresponding signal; at least one optical finer to select the wavelength of light to transmit to the detector from among the established transmission wavelength applied by the light source; at least one sub photodetector for detecting the intensity of the light transmitted through the optical filter, and outputting a corresponding signal, the sub photodetector corresponding to the optical filter; a wavelength discriminator for discriminating the wavelength of the light source based on the signal output by the sub photodetector; and a light measurement unit for measuring the intensity of the light source that is the intensity of the light corresponding to the discriminated wavelength based on the signal output by the main photodetector. The optical measurement unit calibrates the signal output by the main photodetector according to the wavelength of the light source discriminated by the wavelength discriminator, and measures the intensity of the light source based on the calibrated signal.

The sub photodetector measures and outputs the intensity of the light that is output from the light source and is selectively output by the optical filter when the light source is connected to the measurement device and is provided at the start position. The main photodetector measures and outputs the intensity of the light that is output from the light source when the light source is connected to the measurement device and is provided at the end (or final) position.

Therefore, the wavelength of the light source is automatically discriminated during the process for inserting the light source into the device, and the intensity of the light corresponding to the discriminated wavelength can be accurately measured.

Another embodiment of the present invention provides a device for discriminating a wavelength of the light applied by a light source, which comprises: at least one optical filter for selecting the light corresponding to a prediscriminated transmission wavelength to transmit; at least one sub photodetector for detecting the intensity of the light transmitted through the optical filter to output a corresponding signal, the sub photodetector corresponding to the optical filter; and a wavelength discriminator for discriminating the wavelength of the light source based on the signals output by the sub photodetector.

DETAILED DESCRIPTION OF THE INVENTION

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In addition, an inclusion of a constituent element by a component represents that the component can further include other constituent elements instead of excluding them when there is no opposite description.

Figure 1:
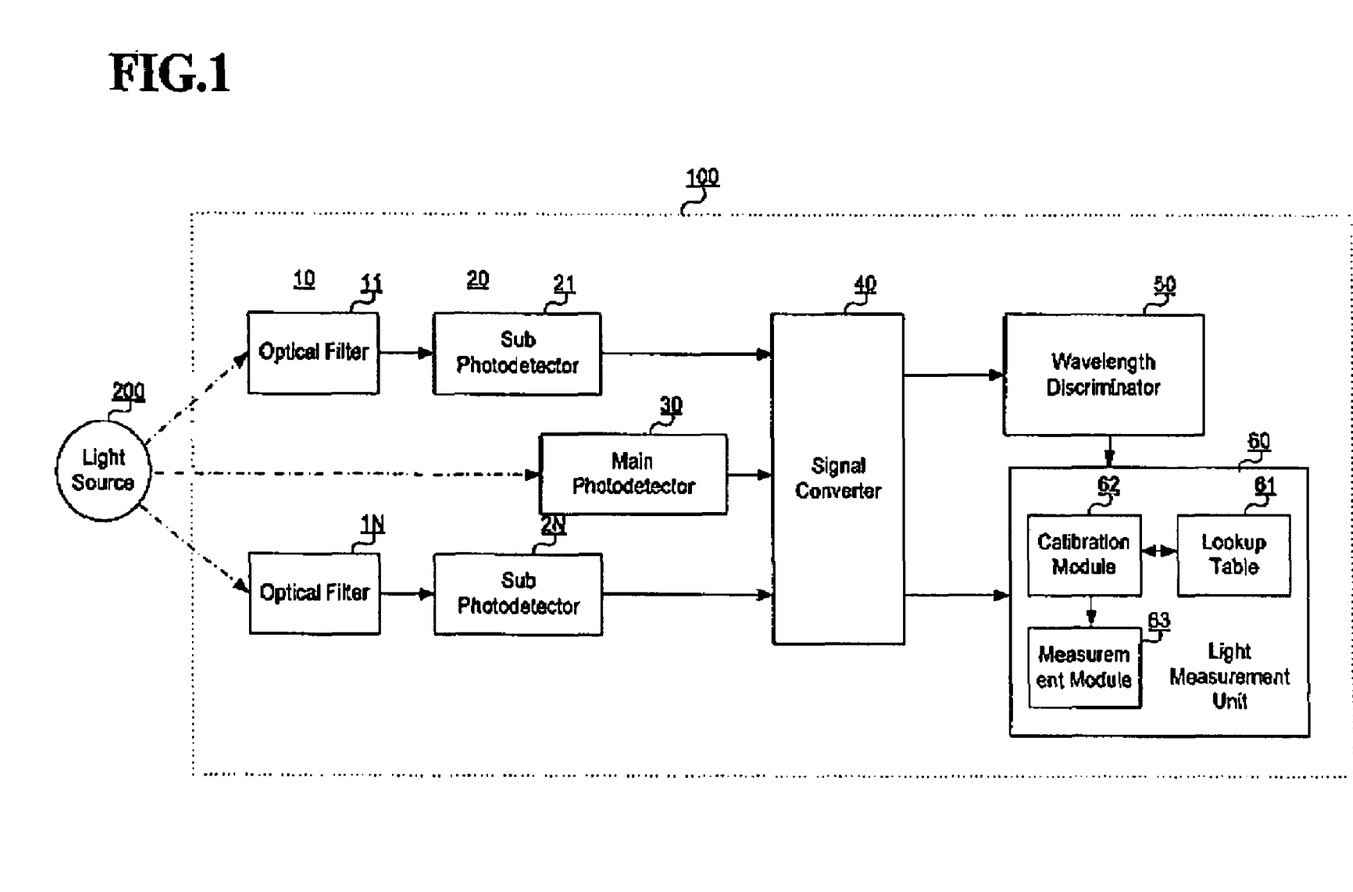
FIG. 1 shows a block diagram for a light wavelength and intensity measuring device according to an embodiment of the present invention.

FIG. 1 shows a block diagram for a light wavelength and intensity measuring device according to an embodiment of the present invention. For better comprehension and ease of description, the light wavelength and intensity measuring device will also be referred to as an "optical measuring device."

The optical measuring device 100 determines the center wavelength of a light source 200 and concurrently measures the light intensity of the discriminated wavelength when the light source is inserted, as shown in FIG. 1. For this purpose, the optical measuring device 100 includes optical filters (11-1N, N=1, 2, 3, . . . ) for filtering the light from the light source 200 according to wavelengths, sub photodetectors (21-2N, N=1, 2, 3, . . . ) for measuring light intensity output by the optical filters, a main photodetector 30 for measuring the light intensity output by the light source, a signal converter 40 for converting the signals output by the photodetectors into predetermined signals, a wavelength discriminator 50 for discriminating the wavelengths of the light source according to the signal output by the sub photodetector and input by the signal converter, and a light measurement unit 60 for measuring the light intensity according to the discriminated wavelength. In addition, the optical measuring device 100 may further include a display (not shown) for displaying the wavelength and light intensity of the measured light source.

In this instance, the light source 200 prediscriminated wavelength is a multi-channel light source with a prediscriminated group of wavelengths, such as optical fibers. The wavelength of the light source represents the center wavelength, and the light intensity means the intensity of the light having the center wavelength. The light source 200 according to the embodiment of the present invention can include other substances in addition to the optical fibers.

The main photodetector 30 measures the light intensity provided by the light source 200 inserted into the optical measuring device 100. The sub photodetectors (21-2N) measure the light intensity having passed the at least one optical filter (11-1N). The optical filters (11-1N) filter the light for respective prediscriminated wavelengths.

Figure 2:
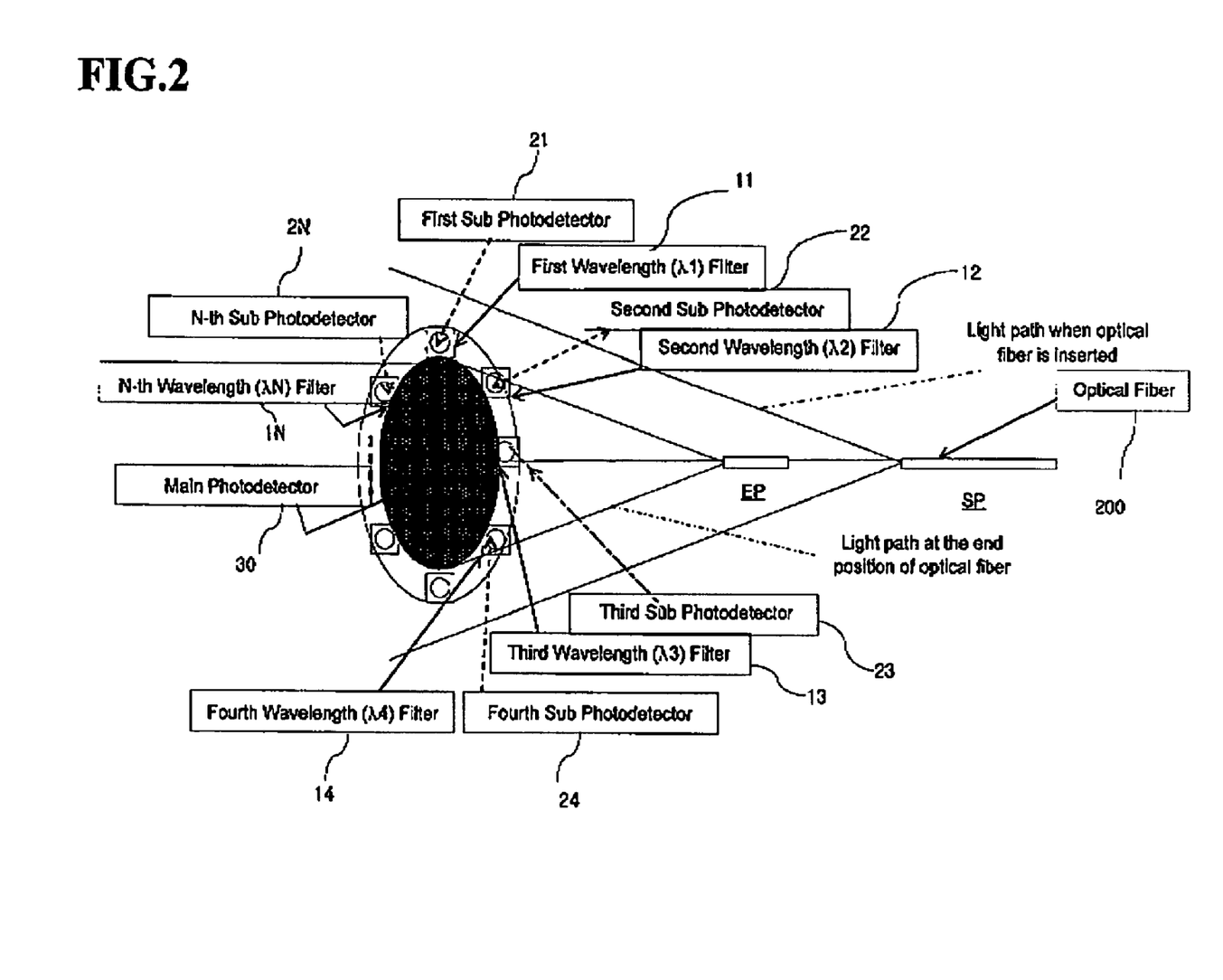
FIG. 2 shows an exemplified configuration diagram for a photodetector and an optical filter shown in FIG. 1.

FIG. 2 shows configurations of photodetectors and optical filters and an arrangement thereof according to an embodiment of the present invention.

As shown in FIG. 2, when the light source 200 is inserted into the optical measuring device 100, the light source 200 is inserted from the start position (SP) and is positioned at the end position (EP.)

As many optical filters (11-1N) as the number ($\lambda_1$-$\lambda_N$) of needed wavelengths to be filtered are provided, and as many sub photodetectors (21-2N) as the number of needed wavelengths for measuring the light intensity having passed the respective filters are provided. Therefore, the respective sub photodetectors 21-2N are provided at the positions corresponding to the optical filters (11-1N.)

The optical filters (11-1N) and the sub photodetectors (21-2N) are provided so as to detect the lights output by the light source 200 when the light source 200 is provided at the start position (SP), and the main photodetector 30 measures the light intensity output by the light source 200 when the light source is inserted into the device and is then provided at the end position (EP.)

In FIG. 2, the first area for outputting and spreading the light when the light source 200 is provided at the start position (SP) is given to be greater than the second area for spreading the light when the same is provided at the end position (EP.)

Accordingly, in the embodiment of the present invention, the dimension of the main photodetector 30 is realized such that it may measure the light provided into the second area, and the dimensions of the sub photodetectors (21-2N) are realized such that they may measure the light output by the optical filters and are arranged at the positions for measuring the light provide into the first area. Also, the optical filters are arranged appropriately so that incident sides of the filters (11-1N) may be set to be vertical to the light output and provided by the light source 200. The above-noted embodiment may have other arrangements.

According to the above-described configuration, as the light source is inserted into the device, the light output by the light source is filtered according to the wavelength to measure the light intensity of the corresponding wavelength, and the light intensity when the light source is completely inserted into the device to reach the end position can be measured.

The main photodetector 30 and the sub photodetectors (21-2N, referred to as 20 hereinafter for better comprehension and ease of description) output electrical signals corresponding to the input light intensity. The configuration of the detectors is well known to a skilled person, and will not be described.

The signal converter 40 receives the signals from the main photodetector 30 or the sub photodetectors 20 and converts the signals into signals in a predetermined format. For example, the signal converter 40 includes an amplifier for amplifying the input current signal and a current-voltage converter for converting the amplified current signal into a corresponding voltage signal. In this instance, the current-voltage converter is not limited thereto. The signal converter may include an A/D converter for converting analog signals into digital signals.

The optical wavelength discriminator 50 discriminates the wavelength based on the signals of the sub photodetectors, output by the signal converter 40. As described above, the optical filters (11-1N, referred to as 10 hereinafter for better comprehension and ease of description) output the light of a prediscriminated wavelength through a filtering process, and the sub photodetector 20 outputs electrical signals corresponding to the light output by the corresponding optical filter. Therefore, when a signal is output from a prediscriminated sub photodetector, it is found that the corresponding signal is a signal for the light having a wavelength corresponding to a transmission passband of the optical filter corresponding to the sub photodetector.

A method for discriminating the wavelength will now be described in detail.

Figure 3:
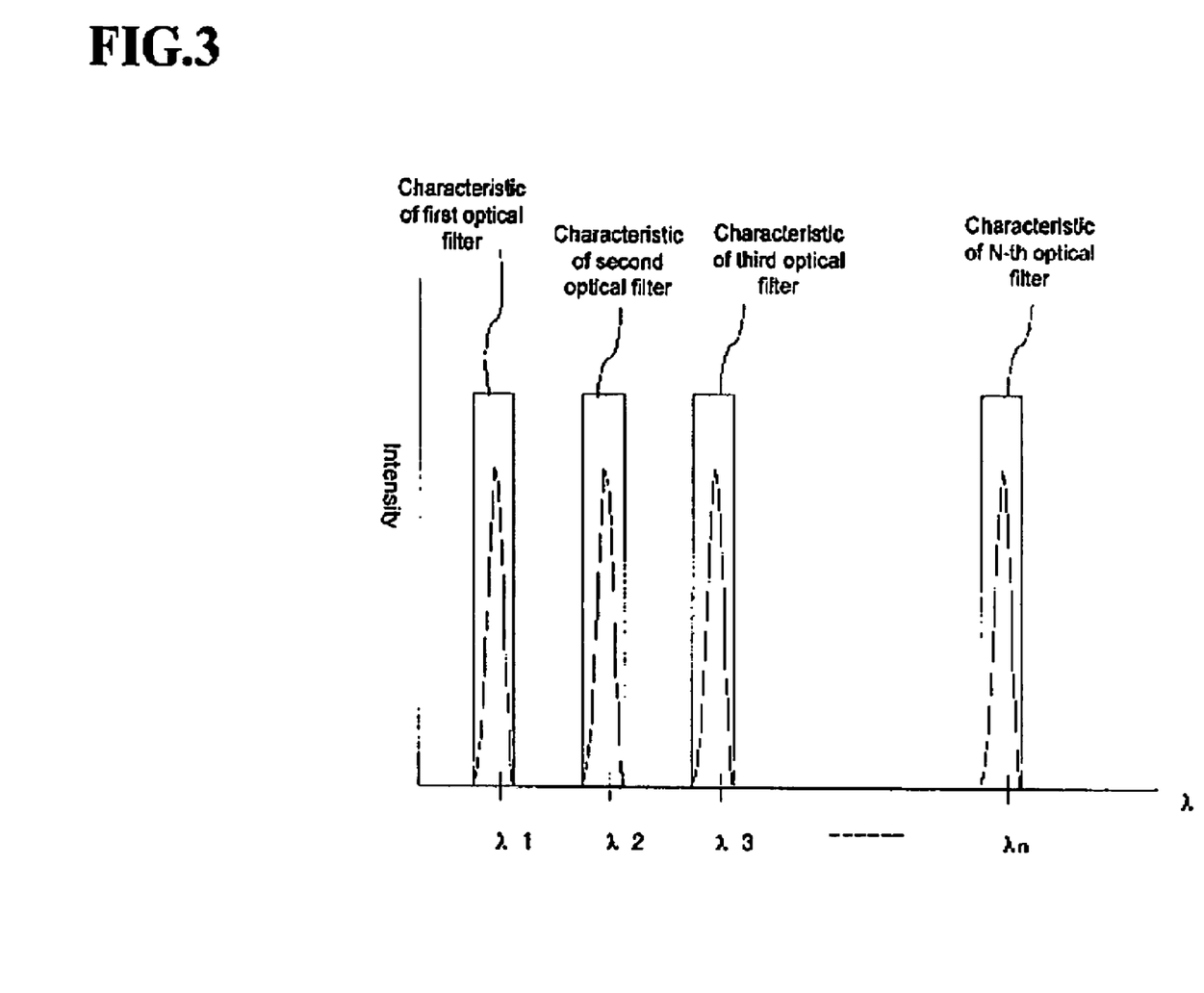
FIG. 3 and FIG. 4 show transmission characteristics of optical filters according to an embodiment of the present invention.
Figure 4:
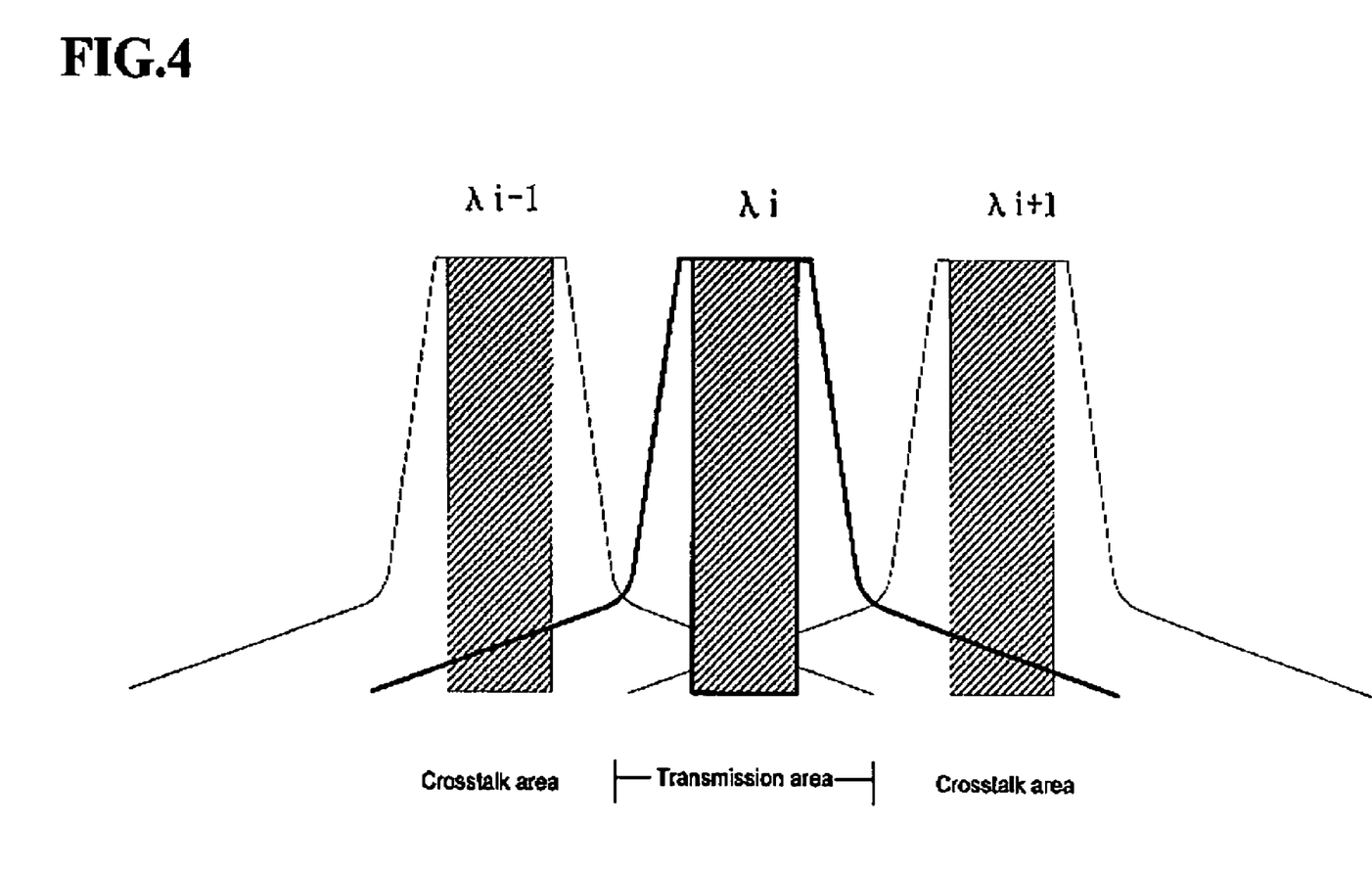

FIG. 3 and FIG. 4 show transmission characteristics of optical filters according to an embodiment of the present invention. As shown in FIG. 3, the optical filters transmit signals of a prediscriminated wavelength corresponding to the transmission area and intercepts signals of other wavelengths. However, the transmission curves of the optical filters do not have the delta function for transmitting wavelengths of the transmission area but have a format of transmission curves overlapped with other wavelengths, as shown in FIG. 4. Therefore, crosstalk occurs in the transmission curve of a prediscriminated optical filter, by which the transmission area is overlapped with other wavelengths. Hence, signals are output from one or more sub photodetectors according to the wavelength of the light input to the optical filter.

For example, it is assumed that the first optical filter has the wavelength of $\lambda_i$ and the second optical filter has the wavelength of $\lambda_{i-1}$. When the light generated by the light source satisfies the transmission characteristic of the first optical filter, the wavelength of the light corresponds to the transmission area of the first optical filter, and hence, signals are output from the first sub photodetector corresponding to the first optical filter. No signals are output from the second sub photodetector corresponding to the second optical filter. Therefore, the wavelength of the light is discriminated by $\lambda_i$.

However, for example, when the wavelength of the light is provided between $\lambda_{i-1}$ and $\lambda_i$, the lights transmits the first optical filter of $\lambda_i$ and the optical filter of $\lambda_{i-1}$ according to the transmission curve of the optical filter as shown in FIG. 4, the first sub photodetector outputs a signal of V1 and the second sub photodetector outputs a signal of V2. Therefore, the wavelength must be discriminated by analyzing the relation between the signals V1 and V2.

In the embodiment of the present invention, when the signals V1 and V2 are obtained through the sub photodetector corresponding to the optical filter of $\lambda_i$ and the sub photodetector corresponding to the optical filter of $\lambda_{i-1}$, the wavelength of the input light is discriminated based on the subsequent equation.

$$\Delta\lambda \times [V2/(V1+V2)] = \text{value 1},$$

$$\text{wavelength} = \lambda_{i-1} + \text{value 1 where } \Delta\lambda = \lambda_i - \lambda_{i-1} (i=2, 3, 4, \ldots)$$ (Equation 1)

Accordingly, when the light having a wavelength that does not accurately satisfy the characteristic of the optical filter is input, the wavelength of the input light can be accurately discriminated.

The light measurement unit 60 measures the intensity of the light source according to the wavelength discriminated by the optical wavelength discriminator, and in detail, it measures the intensity of the light having the discriminated wavelength based on the signal output by the main photodetector.

Figure 5:
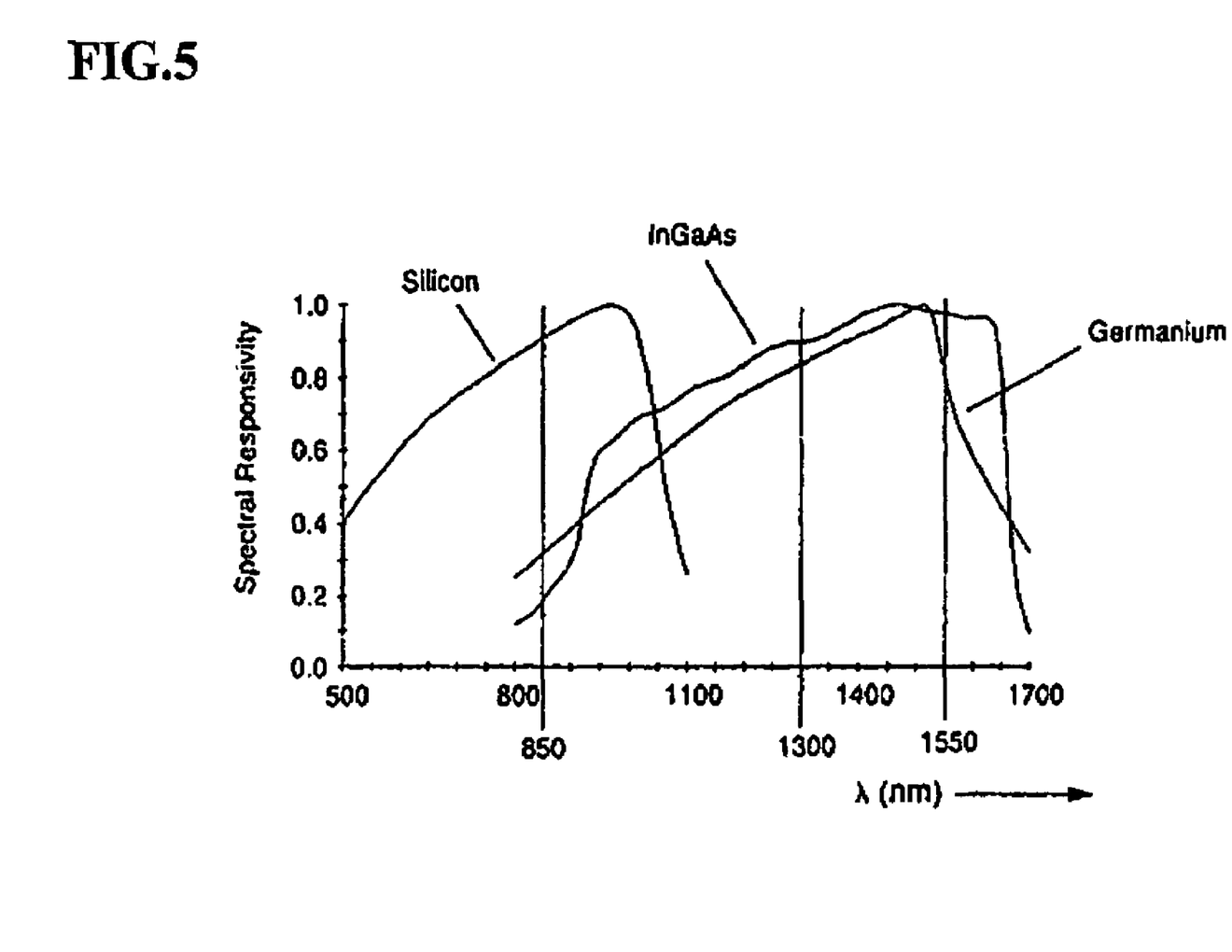
FIG. 5 shows responsivity of the photodetector according to an embodiment of the present invention.

In general, photodetectors have different spectral sensitivity. FIG. 5 shows characteristics of spectral sensitivity of the photodetector. FIG. 5 shows characteristics of spectral sensitivity for different types of photodetectors, and in detail, indicating a germanium (Ge) photodetector, a compound semiconductor (InGaAs) photodetector, and a silicon photodetector.

Referring to FIG. 5, it is found that the Ge photodetector and the InGaAs photodetector sense a wider wavelength area than the silicon photodetector does. The Ge photodetector and the InGaAs photodetector accurately measure the intensity of the corresponding light since the spectral sensitivity for the area of 1550 nm almost reaches "1."

However, the output signals of the photodetectors are substantially reduced when the light with the area of 1550 nm that has a reduced spectral sensitivity is provided. Since the signals output by the photodetectors are varied depending on the spectral sensitivity of the photodetectors, accurate light intensity can be measured by using the signals output by the photodetectors. Therefore, the signals output by the main photodetector are calibrated and the light intensity is measured based on the calibrated signals.

For this purpose, the light measurement unit 60 includes a lookup table 61 for storing calibration values for respective wavelengths, a calibration module 62 for calibrating the signals of the main photodetector, provided by the signal converter based on the lookup table, and a measurement module 63 for measuring the light intensity based on the calibrated signal.

The wavelength discriminator 50 and the optical measurement unit 60 can be realized into a single microprocessor or respective processors. Further, the configuration of the elements can be varied depending on a person of an ordinary skill in the art. In addition to the embodiment of the present invention.

An operation of the light measurement device according to an embodiment of the present invention will now be described.

Figure 6:
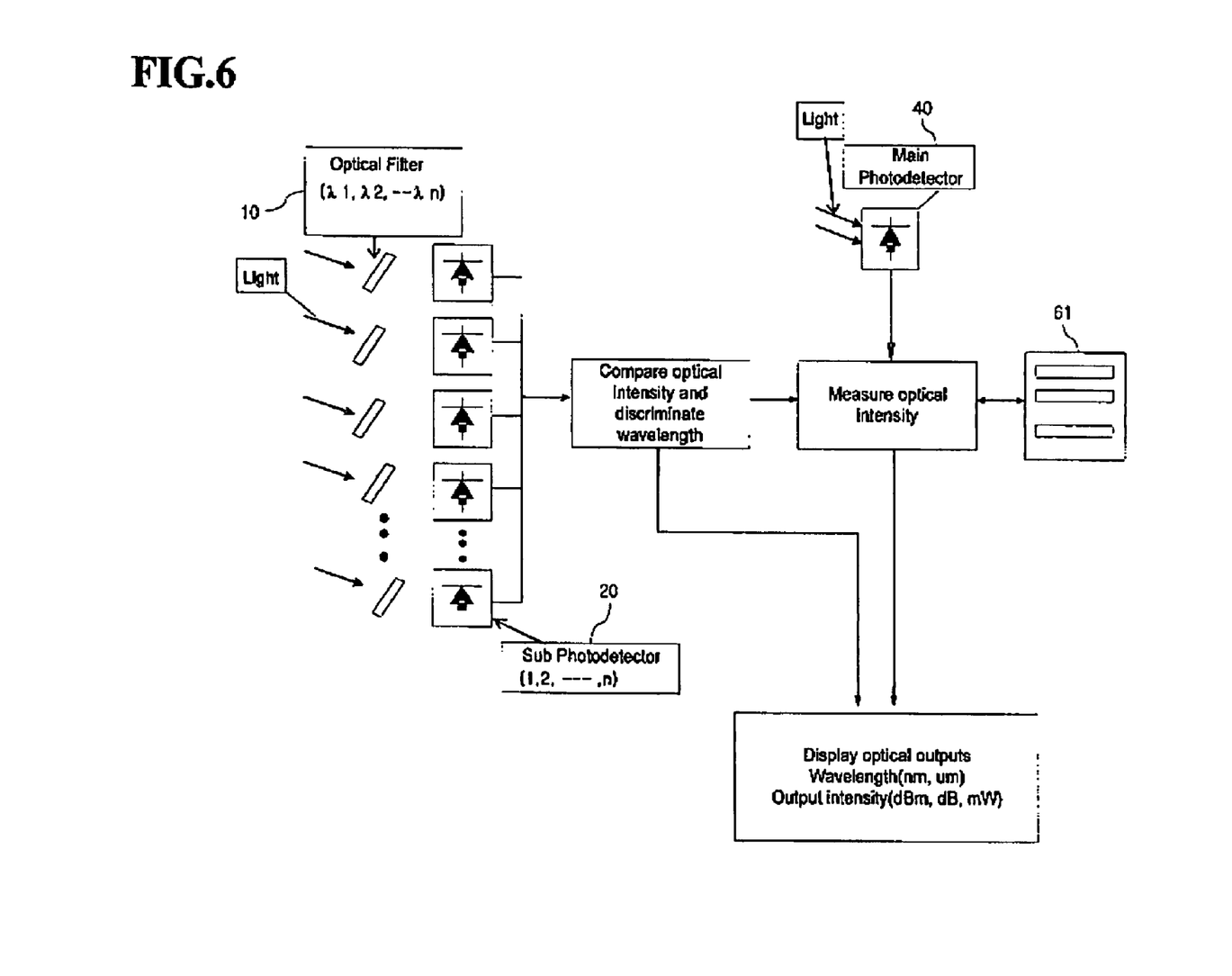
FIG. 6 shows an operational process for the optical measuring device according to an embodiment of the present invention.

FIG. 6 shows the operation of the light measurement device according to an embodiment of the present invention.

For better comprehension and ease of description, the wavelength of the light source 200 will be established to be $\lambda_j$ (i=1, 2, ... N where N is an integer) and the transmission wavelength of the used optical filter will be established to be $\lambda_j$ (j=1, 2, ... N where N is an integer.)

When the light source 200 is inserted into the light measurement device to be at the start position (SP) as shown in FIG. 2, the light generated by the light source 200 is applied to the optical filter 10. The light applied to the optical filter 10 is selectively filtered and output depending on the wavelength. The sub photodetectors 20 corresponding to the respective optical filters selectively output signals corresponding to the light depending on whether the light is output by the corresponding optical filter. For ease of description, the signal output by the sub photodetector will be referred to as a first photodetection signal.

For example, when the light of predetermined intensity of $\lambda_i$ is applied to the optical filter of $\lambda_j$, the light of $\lambda_i$ is applied to the sub photodetector corresponding to the optical filter of $\lambda_j$ in the case of i=j, and no light is applied to other sub photodetectors. As a result, the sub photodetector corresponding to the optical filter of $\lambda_j$ outputs the signal corresponding to the intensity of the light of $\lambda_i$.

In addition, when the wavelength of the light does not correspond to the filter characteristic, that is, when j−1<i<j, as described above, since the light transmits the optical filter of $\lambda_j$ and the optical filter of $\lambda_{j-1}$, the sub photodetector corresponding to the optical filter of $\lambda_j$ and the sub photodetector corresponding to the optical filter of $\lambda_{j-1}$ output signals corresponding to the light intensity.

Hence, on receiving a first photodetection signal from the sub photodetectors, the wavelength discriminator 50 determines the transmission wavelength of the optical filter corresponding to the sub photodetector having provided the first photodetection signal as the wavelength of the light source. On receiving at least two first photodetection signals, the wavelength discriminator 50 determines the wavelength of the light source according to Equation 1. Wavelength information of the light source discriminated by the above-noted process is provided to the light measurement unit 60.

When the light source 200 is completely inserted into the light measurement device to be at the end position (EP) as shown in FIG. 2, the main photodetector 30 detects the light intensity applied by the light source 200 and outputs the intensity. For ease of description, the signals output by the main photodetector 30 will be referred to as a second photodetection signal. The second photodetection signal is amplified by the signal converter 40 to be a corresponding voltage signal, and the voltage signal is then output.

On receiving the second photodetection signal, the light measurement unit 60, refers to the lookup table 61 based on the wavelength discriminated by the wavelength discriminator 50 to determine the calibration value corresponding to the wavelength of the light source, and calibrate the second photodetection signal based on the calibration value. For example, the second photodetection signal can be calibrated by adding the calibration value to the second photodetection signal or multiplying the second photodetection signal by the calibration value. The finally calibrated the second photodetection signal is discriminated then to be the intensity of the light source.

Therefore, in the process for inserting the light source into the light measurement device, the light intensity corresponding to the wavelength of the light source is accurately measured by using the sub photodetector to automatically discriminate the wavelength of the light source and calibrating the light intensity acquired from the main photodetector according to the discriminated wavelength.

In the above-described embodiment of the present invention, the wavelength discriminator 50 and the light measurement unit 60 can be realized as a single microprocessor, and in this case, the output signals by the sub photodetector and the main photodetector can be provided to the microprocessor, and thus, the device according to embodiment of the present invention is simply configured.

Also, it is possible to individually realize the optical filter and the sub photodetector and use them as a wavelength determination device by connecting them to the conventional light intensity measurement device. Detail description on the wavelength determination device will be omitted since a person of an ordinary skill in the art can easily realize the wavelength determination device by using the optical filters and the sub photodetectors based on the above-described embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For example, it is described in the above-noted embodiment that the photodetector and the signal converter are individually realized, but if needed, the signal converter can be realized to be included in the photodetector.

The light wavelength and light intensity can be automatically and concurrently measured by inserting the light source of a prediscriminated wavelength into the device.

Therefore, no additional spectrum analyzer or display data for discriminating wavelengths according to color tags of optical fibers are needed to thus reduce the cost required for discriminating the light wavelength.

Further, by automatically measuring the wavelength and intensity if the light source, it is prevented in advance to erroneously select the wavelength because of manual wavelength selection, and the time and cost for analyzing the wavelength of the light source is saved.

Also, the intensity of the light source is more accurately measured by calibrating the signal measured by the photodetector based on the lookup table other than using the signals as it is.

In addition, the embodiment is applicable to measuring the wavelengths and light intensity of the light source for the coarse wavelength division multiplexing (CWDM), dense wavelength division multiplexing (DWDM), fiber to the office (FTTO), fiber to the building (FTTB), fiber to the curb (FTTC), fiber to the premises (FTTP), fiber to the node (FTTN), fiber to the home (FTTH, generally called FTTx). Further, networks are easily managed by automatically concurrently measuring the wavelength and intensity of the light provided by the light source in the optical subscriber network.

What is claimed is:

1. A device for measuring wavelength and intensity of light applied by a light source, comprising:
   a main photodetector for detecting the intensity of the light applied by the light source and outputting a corresponding signal;
   at least one optical filter for selecting the wavelength of tight transmitted to the main photodetector from among wavelengths applied by the light source, the light satisfying an established transmission wavelength;
   at least one sub photodetector for detecting the intensity of the light transmitted through the optical filter, and outputting a corresponding signal, the sub photodetector corresponding to the optical filter;
   a wavelength discriminator for discriminating the wavelength of the light source based on the signal output by the sub photodetector; and
   a light measurement unit for measuring the intensity of the light source that is the intensity of the light corresponding to the discriminated wavelength based on the signal output by the main photodetector,
   wherein the light measurement unit calibrates the signal output by the main photodetector according to the wavelength of the light source discriminated by the wavelength discriminator, and measures the intensity of the light source based on the calibrated signal.

2. The device of claim 1, further comprising a signal converter for converting signals output by the main photodetector and the sub photodetector into signals in a predetermined format, and providing the signals to the optical measurement unit and the wavelength discriminator.

3. The device of claim 1, wherein the sub photodetector measures and outputs the intensity of the light that is output from the light source and is selectively output by the optical filter when the light source is connected to the measurement device and is provided at the start position, and
   the main photodetector measures and outputs the intensity of the light that is output from the light source when the light source is connected to the measurement device and is provided at the end position.

4. The device of claim 1, wherein the wavelength discriminator discriminates the transmission wavelength of the optical filter corresponding to the sub photodetector as the center wavelength of the light source when a signal is output through the sub photodetector.

5. The device of claim 4, wherein the wavelength discriminator discriminates the wavelength of the light source based on the subsequent equation when acquiring the signals of V1 and V2 through the sub photodetector corresponding to the optical filter of $\lambda_i$ (i=2, 3, 4, . . .) and the sub photodetector corresponding to the optical filter of $\lambda_{i-1}$:

$$\Delta\lambda \times [V2/(V1+V2)] = \text{value 1},$$

wavelength = +value 1 where $\Delta\lambda = \lambda_i - \lambda_{i-1}$.

6. The device of claim 1, wherein the optical measurement unit comprises: a lookup table(or formula etc) for storing calibration values for respective wavelengths;
   a calibration module for determining a calibration value corresponding to the wavelength of the light source discriminated by the wavelength discriminator from the lookup table, and calibrating the signal output by the main photodetector according to the calibration value; and
   a measurement module for establishing the calibrated signal to be the intensity of the light source.

7. The device of claim 1, wherein the light measurement detector and the wavelength discriminator are realized to be included into a microprocessor.

8. The device of claim 1, wherein the incident side of the optical filter is set to be vertical with the light applied by the light source.

9. A device for discriminating a wavelength of the light applied by a light source, comprising:
   at least one optical filter for controlling the light corresponding to a prediscriminated transmission wavelength to transmit;
   at least one sub photodetector for detecting the intensity of the light transmitted through the optical filter to output a corresponding signal, the sub photodetector corresponding to the optical filter; and
   a wavelength discriminator for discriminating the wavelength of the light source based on the signals output by the sub photodetector,
   the wavelength discriminator discriminates the transmission wavelength of the optical filter corresponding to the sub photodetector as a center wavelength of the light source when a signal is output by the sub photodetector, and
   the wavelength discriminator discriminates the wavelength of the light source based on the subsequent equation when acquiring the signals of V1 and V2 through the sub photodetector corresponding to the optical filter of $\lambda_i$ (i=2, 3, 4, . . .) and the sub photodetector corresponding to the optical filter of $\lambda_{i-1}$:

$$\Delta\lambda \times [V2/(V1+V2)] = \text{value 1},$$

wavelength=$\lambda_{i-1}$+value 1 where $\Delta\lambda = \lambda_i - \lambda_{i-1}$.

* * * * *